(12) United States Patent
Dietrich et al.

(10) Patent No.: US 9,235,630 B1
(45) Date of Patent: Jan. 12, 2016

(54) DATASET DISCOVERY IN DATA ANALYTICS

(71) Applicant: EMC Corporation, Hopkinton, MA (US)

(72) Inventors: David Dietrich, Hopedale, MA (US); Stephen Todd, Shrewsbury, MA (US); Rhonda Baldwin, Campbell, CA (US); Wayne A. Pauley, Jr., Hudson, NH (US)

(73) Assignee: EMC Corporation, Hopkinton, MA (US)

( * ) Notice: Subject to any disclaimer, the term of this patent is extended or adjusted under 35 U.S.C. 154(b) by 226 days.

(21) Appl. No.: 14/036,612

(22) Filed: Sep. 25, 2013

(51) Int. Cl.
*G06F 17/00* (2006.01)
*G06N 5/00* (2006.01)
*G06F 17/30* (2006.01)

(52) U.S. Cl.
CPC .... *G06F 17/30572* (2013.01); *G06F 17/30592* (2013.01)

(58) Field of Classification Search
USPC .......................................................... 706/45
See application file for complete search history.

(56) References Cited

U.S. PATENT DOCUMENTS

| 8,548,954 | B2* | 10/2013 | Cina ............................. 707/665 |
| 8,700,678 | B1* | 4/2014 | Fan et al. ............ G06F 11/1415 707/602 |
| 9,098,617 | B1* | 8/2015 | Pauley, Jr. et al. ..... G06N 99/00 |
| 9,098,803 | B1* | 8/2015 | Todd et al. ............... G06N 5/02 |
| 2002/0198889 | A1 | 12/2002 | Vishnubhotla |
| 2004/0128287 | A1 | 7/2004 | Keller et al. |
| 2008/0294583 | A1 | 11/2008 | Hunt et al. |
| 2010/0017870 | A1 | 1/2010 | Kargupta |
| 2010/0088284 | A1* | 4/2010 | Cina ............................. 707/665 |
| 2011/0066589 | A1 | 3/2011 | Chang et al. |
| 2011/0145392 | A1 | 6/2011 | Dawson et al. |
| 2011/0251874 | A1 | 10/2011 | Banthia et al. |
| 2012/0054182 | A1 | 3/2012 | Gupta et al. |
| 2012/0089980 | A1 | 4/2012 | Sharp et al. |
| 2012/0131591 | A1 | 5/2012 | Moorthi et al. |
| 2012/0158633 | A1 | 6/2012 | Eder |
| 2012/0185851 | A1 | 7/2012 | Zhang et al. |
| 2012/0215582 | A1 | 8/2012 | Petri et al. |
| 2012/0233315 | A1 | 9/2012 | Hoffman et al. |
| 2012/0271949 | A1 | 10/2012 | Radhakrishnan et al. |
| 2012/0330869 | A1 | 12/2012 | Durham |
| 2013/0091170 | A1 | 4/2013 | Zhang et al. |
| 2013/0139152 | A1 | 5/2013 | Chang et al. |

(Continued)

OTHER PUBLICATIONS

Analytical Pathway Methodology: Simplifying Business Intelligence Consulting Proctor, L.; Kieliszewski, C.A.; Hochstein, A.; Spangler, S. SRII Global Conference (SRII), 2011 Annual Year: 2011 pp. 495-500, DOI: 10.1109/SRII.2011.57 Referenced in: IEEE Conference Publications.*

(Continued)

*Primary Examiner* — Michael B Holmes
(74) *Attorney, Agent, or Firm* — Ryan, Mason & Lewis, LLP

(57) ABSTRACT

An initial work package is obtained. The initial work package defines at least one hypothesis associated with a given data problem, and is generated in accordance with one or more phases of an automated data analytics lifecycle. A plurality of datasets is identified. One or more datasets in the plurality of datasets that are relevant to the at least one hypothesis are discovered. The at least one hypothesis is tested using at least a portion of the one or more discovered datasets.

20 Claims, 5 Drawing Sheets

(56) References Cited

U.S. PATENT DOCUMENTS

| | | |
|---|---|---|
| 2013/0173569 A1 | 7/2013 | Pearcy |
| 2013/0326538 A1 | 12/2013 | Gupta et al. |
| 2014/0115610 A1 | 4/2014 | Marinelli et al. |
| 2014/0330744 A1* | 11/2014 | Hampapur et al. ........... 705/348 |
| 2014/0330745 A1* | 11/2014 | Hampapur et al. ........... 705/348 |

OTHER PUBLICATIONS

Automating scholarly article data collection with Action Science Explorer Amjad, S.; Mukhtar, H.; Dunne, C. Open Source Systems and Technologies (ICOSST), 2014 International Conference on Year: 2014 pp. 160-169, DOI: 10.1109/ICOSST.2014.7029338 Referenced in: IEEE Conference Publications.*

Intelligent Information Lifecycle Management in Virtualized Storage Environments Alatorre, G.; Singh, A.; Mandagere, N.; Butler, E.; Gopisetty, S.; Yang Song Global Conference (SRII), 2014 Annual SRII Year: 2014 pp. 9-18, DOI: 10.1109/SRII.2014.12 Referenced in: IEEE Conference Publications.*

Semantic data fusion through visually-enabled analytical reasoning Guoray Cai; Graham, J. Information Fusion (Fusion), 2014 17th International Conference on Year: 2014 pp. 1-7 Referenced in: IEEE Conference Publications.*

P. Mell et al., "The NIST Definition of Cloud Computing," U.S. Department of Commerce, Computer Security Division, National Institute of Standards and Technology, Special Publication 800-145, Sep. 2011, 7 pages.

U.S. Appl. No. 13/628,589, filed in the name of W.A. Pauley, Jr. et al. Sep. 27, 2012 and entitled "Data Analytics Lifecycle Automation."

P.K. Gunda, et al., "Nectar: Automatic Management of Data and Computation in Datacenters," Proceedings of the 9th Symposium on Operating Systems Design and Implementation (OSDI), Oct. 2010, 14 pages.

H. Herodotou et al., "MapReduce Programming and Cost-Based Optimization? Crossing this Chasm with Starfish," Proceedings of the VLDB Endowment, 2011, 4 pages, vol. 4, No. 12.

H. Herodotou et al., "Starfish: A Self-Tuning System for Big Data Analytics," 5th Biennial Conference on Innovative Data Systems Research (CIRD '11), Jan. 2011, pp. 261-272.

G. Lee et al., "Heterogeneity-Aware Resource Allocation and Scheduling in the Cloud," Proceedings of the USENIX Conference on Hot Topics in Cloud Computing, 2011, pp. 1-5.

T. Nykiel et al., "MRShare: Sharing Across Multiple Queries in MapReduce," Proceedings of the VLDB Endowment, 2010, pp. 494-505, vol. 3, No. 1.

P. Russom et al., "Big Data Analytics," TDWI Best Practices Report, 2011, 38 pages, The Data Warehousing Institute.

R.G. Sargent, "Verification and Validation of Simulation Models," Proceedings of the 2005 Winter Simulation Conference, 2005, pp. 130-143.

I.H. Witten et al., "Data Mining: Practical Machine Learning Tools and Techniques," 2011, 664 pages, 3d ed., Morgan Kaufmann Publishers, United States.

K. Zhang et al., "Sedic: Privacy-Aware Data Intensive Computing on Hybrid Clouds," Proceedings of the 18th ACM Conference on Computer and Communications Security (CCS '11), 2011, pp. 515-525.

U.S. Appl. No. 13/728,394, filed in the name of David Dietrich Dec. 27, 2012 and entitled "Data Analytics Lifecycle Processes."

* cited by examiner

DATASET DISCOVERY IN DATA ANALYTICS

FIELD

The field relates to data science, and more particularly to techniques for discovering datasets for use in data analytics.

BACKGROUND

Data science typically refers to the science that incorporates various disciplines including, but not limited to, data engineering, mathematics, statistics, computing, and domain-specific expertise. A data scientist thus is one who practices some or all aspects of data science in attempting to solve complex data problems. Data analytics is one aspect of data science.

Conventional data analytics solutions are becoming more and more limited due to the increasing sizes and varieties of data sets that such solutions are applied against. For example, such limitations include the lack of ability to determine which datasets among the increasing sizes and varieties of data sets are relevant to solutions of any given complex data problems.

Accordingly, improved data analytics techniques are needed that enable business users and data scientists to execute data analytics more easily and efficiently.

SUMMARY

Embodiments of the invention provide techniques for discovering datasets for use in data analytics.

In one embodiment, a method comprises the following steps. An initial work package is obtained. The initial work package defines at least one hypothesis associated with a given data problem, and is generated in accordance with one or more phases of an automated data analytics lifecycle. A plurality of datasets is identified. One or more datasets in the plurality of datasets that are relevant to the at least one hypothesis are discovered. The at least one hypothesis is tested using at least a portion of the one or more discovered datasets.

In another embodiment, a computer program product is provided which comprises a processor-readable storage medium having encoded therein executable code of one or more software programs. The one or more software programs when executed by one or more processing elements of a computing system implement steps of the above-described method.

In yet another embodiment, an apparatus comprises a memory and a processor operatively coupled to the memory and configured to perform steps of the above-described method.

Advantageously, illustrative embodiments described herein enable business users and data scientists to leverage methodologies that catalog and describe datasets to support hypothesis tests within a work package that is created to automate a data analytics lifecycle. It is realized here that finding the appropriate datasets for a given analysis or experiment can be one of the most challenging aspects of a data science project. Illustrative embodiments overcome these and other challenges.

These and other features and advantages of the present invention will become more readily apparent from the accompanying drawings and the following detailed description.

DETAILED DESCRIPTION

Figure 1A:
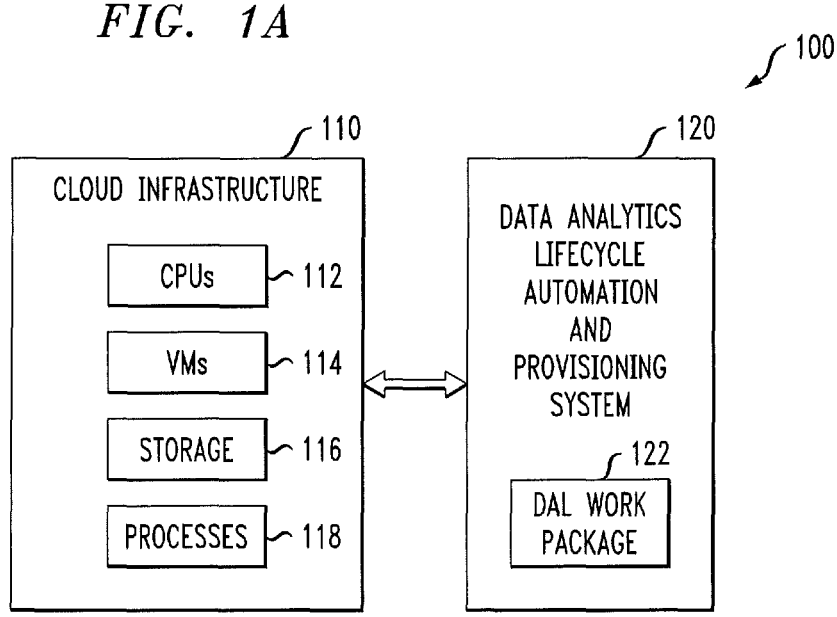
FIG. 1A illustrates cloud infrastructure and a data analytics lifecycle automation and provisioning system, in accordance with one embodiment of the invention.

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the term "provisioning" refers to the process(es) of generating and/or deploying one or more computing resources in a computing system, such as for example, in a cloud infrastructure environment, generating and deploying one or more virtual machines and logical storage units in a data center.

As used herein, the term "enterprise" refers to a business, company, firm, venture, organization, operation, concern, corporation, establishment, partnership, a group of one or more persons, or some combination thereof.

It is to be appreciated that prior to a detailed description of dataset discovery techniques according to embodiments of the invention, we will first describe, in Section I, an exemplary data analytics lifecycle automation and provisioning system in which, and/or with which, the dataset discovery techniques can be implemented. Illustrative dataset discovery techniques will then be described below in Section II. However, it is to be further appreciated that the dataset discovery techniques may be alternatively implemented in a standalone system or in any other data analytics system in which it would be desirable to improve ease of use and efficiency of the system.

I. Exemplary Data Analytics Lifecycle Automation and Provisioning System

FIGS. 1A through 4 will be used to describe the exemplary data analytics lifecycle automation and provisioning system.

Further details of this exemplary system can be found in the U.S. patent application identified as Ser. No. 13/628,589, filed on Sep. 27, 2012, and entitled "Data Analytics Lifecycle Automation," the disclosure of which is incorporated by reference herein in its entirety.

FIG. 1A shows a system 100 configured in accordance with an illustrative embodiment of the present invention. The system 100 comprises cloud infrastructure 110 and a data analytics lifecycle automation and provisioning system 120.

As will be explained in detail below, the data analytics lifecycle automation and provisioning system 120 enables a data scientist to automatically, yet still interactively, create a work package 122 that can be executed to solve one or more complex data problems. By "work package" it is meant a specific set of instructions that are used for analysis, preparation, and/or support of steps within a data analytic lifecycle (e.g., a data analytic plan) for solving the one or more complex data problems. System 120 accomplishes this, as will be explained in detail below, by providing processing elements that embody phases of a data analytics lifecycle (DAL) including, but not limited to, discovery, data preparation, model planning, model building, and operationalization of results.

Cloud infrastructure 110 is illustratively depicted in the figure as comprising an execution environment with execution components comprising one or more central processing units (CPUs) 112, one or more VMs 114, and storage devices 116 (upon which logical units (LUNs) are implemented) that execute one or more processes 118 that operate on one or more process input data sets that generate one or more process output data sets. Thus, the work package generated by system 120 can be operationalized using execution components (both physical and virtual computing resources) in the cloud infrastructure 110. A dataset discovery system and methodologies used to discover datasets usable by the data analytics lifecycle automation and provisioning system 120 will be described below in the context of FIG. 5.

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the data analytics lifecycle automation and provisioning system 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
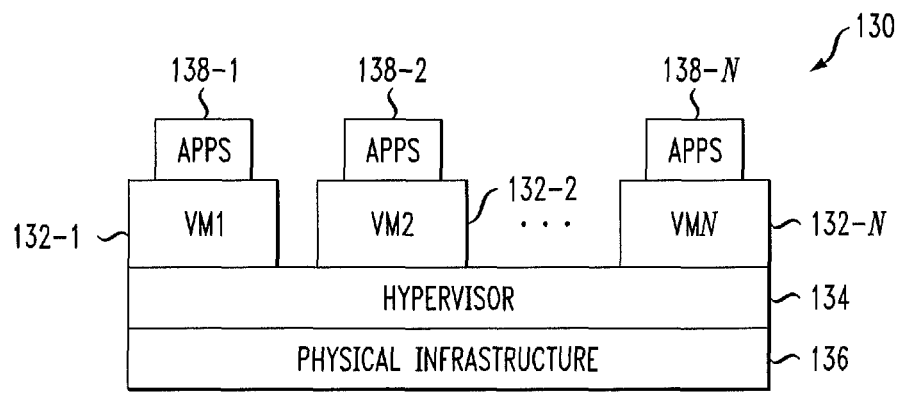
FIG. 1B illustrates a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134 is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated LUNs or virtual disks) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

An example of a commercially available hypervisor platform that may be used to implement portions of the cloud infrastructure 130 (110) in one or more embodiments of the invention is the VMware vSphere® which may have an associated virtual infrastructure management system such as the VMware vCenter®. The underlying physical infrastructure 136 may comprise one or more distributed processing platforms that include storage products such as VNX® and Symmetrix VMAX®, both commercially available from EMC Corporation of Hopkinton, Mass. A variety of other storage products may be utilized to implement at least a portion of the cloud infrastructure 130 (110).

Figure 2:
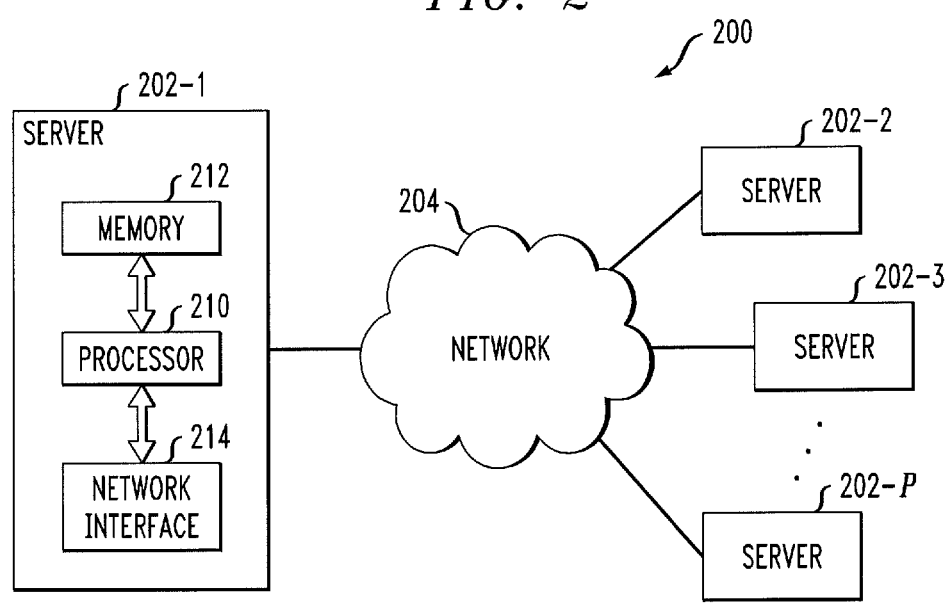
FIG. 2 illustrates a processing platform on which the cloud infrastructure and the data analytics lifecycle automation and provisioning system of FIG. 1A are implemented, in accordance with one or more embodiments of the invention.

An example of a processing platform on which the cloud infrastructure 110 and/or the data analytics lifecycle automation and provisioning system 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements.

Memory 212 (or other storage device) having program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals. Furthermore, memory 212 may comprise electronic memory such as random access memory (RAM), read-only memory (ROM) or other types of memory, in any combination. One or more software programs when executed by a processing device such as the processing device 202-1 causes the device to perform functions associated with one or more of the elements/components of system environment 100. One skilled in the art would be readily able to implement such software given the teachings provided herein. Other examples of processor-readable storage media embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Illustrative details of the data analytics lifecycle automation and provisioning system 120 will now be described with reference to FIGS. 3 and 4.

It is to be understood that the spectrum of complex data problem types that the data analytics lifecycle automation and provisioning system can be used to address is far reaching. By way of example only, the data scientist (as well as other actors in a data analytics lifecycle) is typically faced with the task of designing a data processing system that handles data associated with tasks such as, for example, a complex research project, a data mining project involving a very large amount of data (so-called "big data"), one or more applications that a customer entity wishes to be hosted by a service provider entity (e.g., in a data center environment), a business problem, etc. The common problem that a database administrator, a data engineer, or a data scientist faces with each of these complex data problem types is how to design and provision the computing environment (platform) that will be used for analysis and what data sets to include in the analysis. Part of the problem is also identifying the size and compute power needed for the analytic "sandbox," as will be described below, in which the data scientist will work and experiment with the data.

Figure 3:
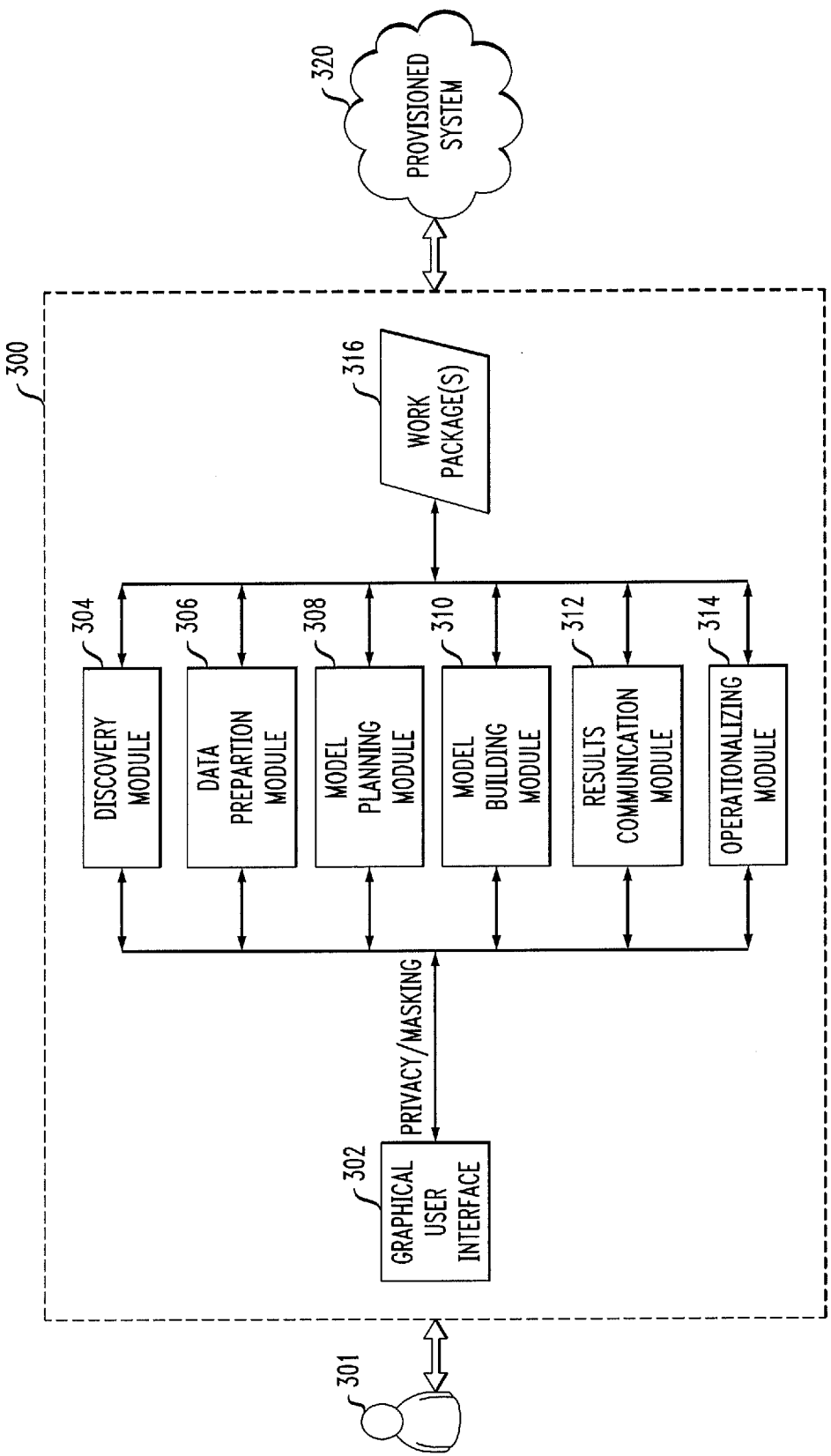
FIG. 3 illustrates a data analytics lifecycle automation and provisioning system, in accordance with one embodiment of the invention.
Figure 4:
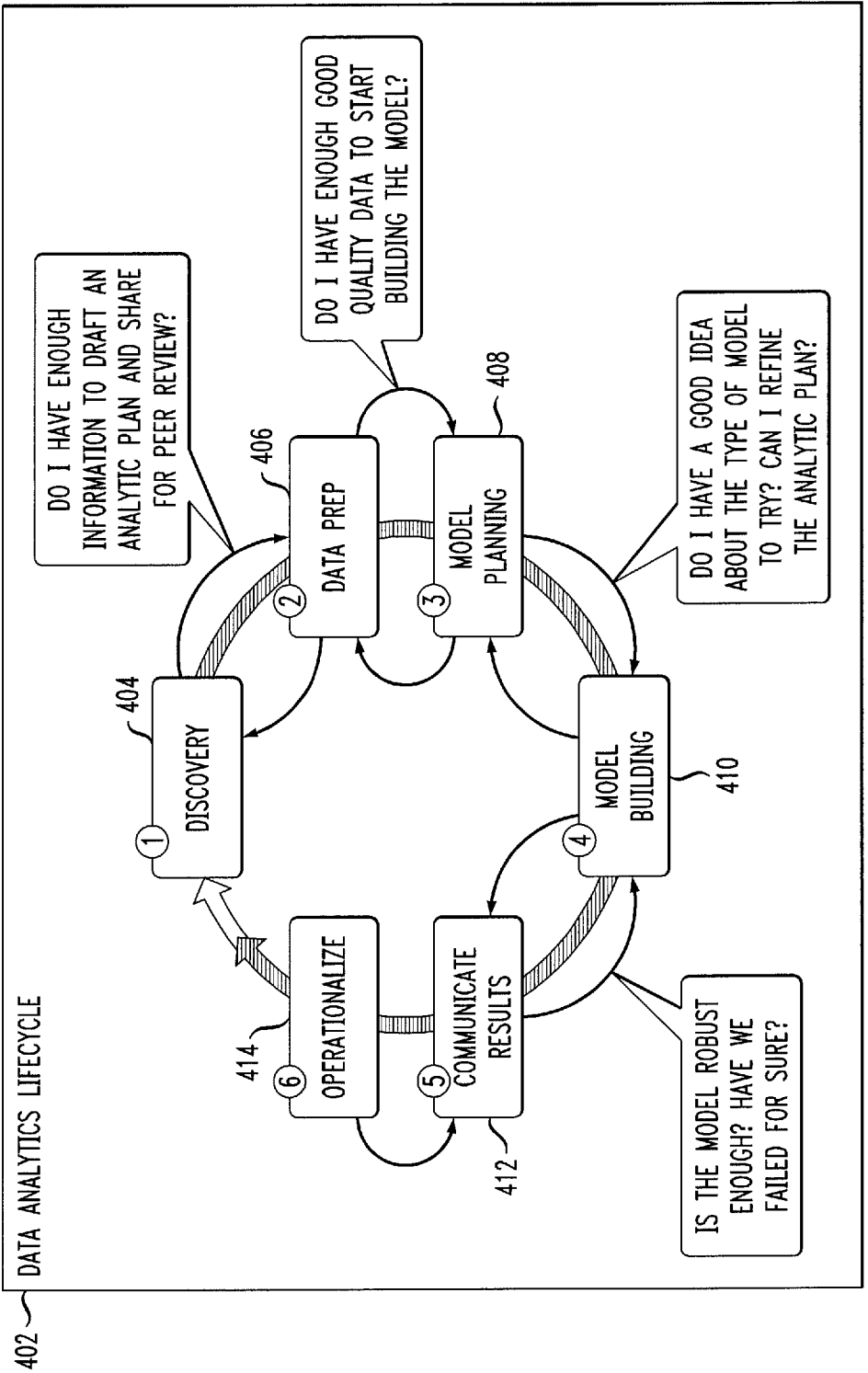
FIG. 4 illustrates a data analytics lifecycle automation and provisioning methodology, in accordance with one embodiment of the invention.

FIG. 3 illustrates a system for assisting the data scientist, inter alia, to overcome the problems mentioned above. More particularly, FIG. 3 depicts a data analytics lifecycle automation and provisioning system 300 (e.g., corresponding to system 120 of FIG. 1) that allows a data scientist 301 (or some other user or users, e.g., business user) to design and generate a provisioned system 320 that can be used to analyze and otherwise process data associated with a given complex data problem.

As shown, system 300 includes a graphical user interface 302, a discovery module 304, a data preparation module 306, a model planning module 308, a model building module 310, a results communication module 312, an operationalizing module 314, and one or more work packages 316. Note that the components of system 300 in FIG. 3 may be implemented on a single computing system, or one or more components of system 300 may be implemented in a distributed computing system, e.g., across multiple servers 202 in FIG. 2.

The graphical user interface (GUI) 302 is the interface(s) through which the data scientist 301 interacts (e.g., enters data, responses, queries to one or more modules, and receives data, results, and other output generated by one or more modules) with system 300. It is to be understood that the interface used to interact with system 300 does not necessarily have to be a graphical user interface, but rather could be through command lines or some other form of input/output. As such, embodiments of the invention are not limited to any particular form of user interface.

Note that the six modules of the system 300 respectively correspond to the phases of a data analytics lifecycle (DAL). FIG. 4 depicts the six phases of a DAL 402, according to one embodiment of the invention, including: a discovery phase 404, a data preparation phase 406, a model planning phase 408, a model building phase 410, a results communication phase 412, and an operationalizing phase 414. Each component of the system 300 assists the data scientist 301 in generating work package 316 that is used to provision the actual analytics system (provisioned system 320) that addresses the given complex data problem.

A description of each DAL phase will now be given with an exemplary problem for which the system 320 is being designed and provisioned. In this example, the problem is a business problem. More specifically, and by way of example only, the business problem is assumed to be the task of accelerating innovation in a global technology corporation. Three aspects of this problem may be: (a) the tracking of knowledge growth throughout the global employee base of the corporation; (b) ensuring that this knowledge is effectively transferred within the corporation; and (c) effectively converting this knowledge into corporate assets. Developing an analytics system (320 in FIG. 3) that executes on these three aspects more effectively should accelerate innovation, which will thus improve the viability of the corporation. Thus, the task of system 300 is to develop such an analytics system. Of course, it is to be understood that this corporate innovation acceleration problem is just one of a myriad of examples of complex data problems that system 300 using DAL 402 can be used to address.

Discovery Phase 404 (Performed by Module 304 in System 300).

In the discovery phase, the data scientist develops an initial analytic plan. The analytic plan lays the foundation for all of the work in the analytic project being developed to address the business problem. That is, the analytic plan assists the data scientist 301 in identifying the business problem, a set of hypotheses, the data set, and a preliminary plan for the creation of algorithms that can prove or disprove the hypotheses. By way of example only, in the corporate innovation acceleration problem mentioned above, one hypothesis identified by the user as part of the analytic plan may be that an increase in geographic knowledge transfer in a global corporation improves the speed of idea delivery. This hypothesis paves the way for what data will be needed and what type of analytic methods will likely need to be used.

Data Preparation Phase 406 (Performed by Module 306 in System 300).

As the arrows in DAL 402 indicate, the six phases are iterative and interrelated/interconnected, and as such, one phase can be returned to/from one of the other phases in the process. Also, proceeding to the second phase (406) is often a matter of whether or not the data scientist is ready and comfortable sharing the analytic plan developed in the first phase (404) with his/her peers (this comfort level is reflective of the maturity of the analytic plan—if it is too rough and unformed, it will not be ready to be shared for peer review). If so, then the data preparation phase 406 can begin. That is, once the analytic plan has been delivered and socialized, the next step focuses on the data. In particular, the next step is about conditioning the data. The data must be in an acceptable shape, structure, and quality to enable the subsequent analysis.

Continuing with the corporate innovation acceleration example, assume that the type of data that the analytics project relies on falls into two categories: (i) an "idea submission" data set (essentially a large-scale database containing structured data); and (ii) a globally-distributed set of unstructured documents representing knowledge expansion within the corporation in the form of minutes and notes about innovation/research activities. It is realized that these data sets cannot be analyzed in their raw formats. In addition, it is possible that the data is not of sufficient quality. Furthermore, the data is likely inconsistent.

All of these issues suggest that a separate analytic "sandbox" must be created to run experiments on the data. The "sandbox" here refers to a separate analytics environment used to condition and experiment with the data. This sandbox is realized via data preparation module 306. On average the size of this sandbox should be roughly ten times the size of the data in question. As such, the sandbox preferably has: (i) large bandwidth and sufficient network connections; (ii) a sufficient amount of data including, but not limited to, summary data, structured/unstructured, raw data feeds, call logs, web logs, etc.; and (iii) transformations needed to assess data quality and derive statistically useful measures. Regarding transformations, it is preferred that module 306 transform the data after it is obtained, i.e., ELT (Extract, Load, Transform), as opposed to ETL (Extract, Transform, Load). However, the transformation paradigm can be ETLT (Extract, Transform, Load, Transform again), in order to attempt to encapsulate both approaches of ELT and ETL. In either the ELT or ETLT case, this allows analysts to choose to transform the data (to obtain conditioned data) or use the data in its raw form (the original data). Examples of transformation tools that can be available as part of data preparation module 306 include, but are not limited to, Hadoop™ (Apache Software Foundation) for analysis, Alpine Miner™ (Alpine Data Labs) for creating analytic workflows, and R transformations for many general purpose data transformations. Of course, a variety of other tools may be part of module 306.

It is further realized that once the sandbox is created, there are three key activities that allow a data scientist to conclude whether or not the data set(s) he/she is using is sufficient:

(i) Familiarization with the data. The data scientist 301 lists out all the data sources and determines whether key data is available or more information is needed. This can be done by referring back to the analytic plan developed in phase 404 to determine if one has what is needed, or if more data must be loaded into the sandbox.

(ii) Perform data conditioning. Clean and normalize the data. During this process, the data scientist 301 also discerns what to keep versus what to discard.

(iii) Survey and visualize the data. The data scientist 301 can create overviews, zoom and filter, get details, and begin to create descriptive statistics and evaluate data quality.

As will be described below in Section II, the discovery module 304 and/or the data preparation module 306 can operate in conjunction with a dataset discovery system to be described below in the context of FIG. 5. In an alternative embodiment, such a dataset discovery system may be implemented as part of the discovery module 304 and/or the data preparation module 306. However, as will be further explained below in the context of FIG. 5, such a dataset discovery system is configured to operate in conjunction with one or more of the other modules (302 through 312) of the system 300.

Model Planning Phase 408 (Performed by Module 308 in System 300).

Model planning represents the conversion of the business problem into a data definition and a potential analytic approach. A model contains the initial ideas on how to frame the business problem as an analytic challenge that can be solved quantitatively. There is a strong link between the hypotheses made in phase 404 (discovery phase) and the analytic techniques that will eventually be chosen. Model selection (part of the planning phase) can require iteration and overlap with phase 406 (data preparation). Multiple types of models are applicable to the same business problem. Selection of methods can also vary depending on the experience of the data scientist. In other cases, model selection is more strongly dictated by the problem set.

Described below are a few exemplary algorithms and approaches (but not an exhaustive list) that may be considered by the data scientist 301 in the exemplary accelerated corporate innovation hypothesis given above:

(i) Use Map/Reduce for extracting knowledge from unstructured documents. At the highest level, Map/Reduce imposes a structure on unstructured information by transforming the content into a series of key/value pairs. Map/Reduce can also be used to establish relationships between innovators/researchers discussing the knowledge.

(ii) Natural language processing (NLP) can extract "features" from documents, such as strategic research themes, and can store them into vectors.

(iii) After vectorization, several other techniques could be used:
  (a) Clustering (e.g., k-means clustering) can find clusters within the data (e.g., create 'k' types of themes from a set of documents).
  (b) Classification can be used to place documents into different categories (e.g., university visits, idea submission, internal design meeting).
  (c) Regression analysis can focus on the relationship between an outcome and its input variables, and answers the question of what happens when an independent variable changes. Regression analysis can help in predicting outcomes. This could suggest where to apply resources for a given set of ideas.
  (d) Graph theory (e.g., social network analysis) is a way to establish relationships between employees who are submitting ideas and/or collaborating on research.

At this point in the DAL 402, the data scientist 301 has generated some hypotheses, described potential data sets, and chosen some potential models for proving or disproving the hypotheses.

Model Building Phase 410 (Performed by Module 310 in System 300).

In the model building phase, the system experimentally runs the one or more models that the data scientist 301 selected in phase 408. The model(s) may be executed on a portion of the original (raw) data, a portion of the conditioned data (transformed in phase 406), or some combination thereof. In this phase, the initial data analytic plan is updated to form a refined data analytic plan.

For example, Map/Reduce algorithm, NLP, clustering, classification, regression analysis and/or graph theory models are executed by module 310 on a test sample of the data identified and conditioned by module 306 in phase 406 (data preparation). Here the data scientist 301 is able to determine whether the models he/she selected are robust enough (which depends on the specific domain of the data problem being addressed) and whether he/she should return to the model planning phase 408. For example, in the corporate innovation acceleration example, some portion of the data sets identified in the earlier phases (e.g., structured idea submissions and unstructured support documents) is processed with the selected models.

Results Communication Phase 412 (Performed by Module 312 in System 300).

In the results communication phase, the results of the model execution of phase 410 are reported to the data scientist 301 (via GUI 302). This phase is also where the analytic plan that was initially developed in phase 404 and fine-tuned through phases 406, 408 and 410 can be output by the system 300 (i.e., as a refined or final analytic plan). The final analytic plan at this point in the DAL 402 may be referred to as a work package (316 in FIG. 3).

Operationalizing Phase 414 (Performed by Module 314 in System 300).

Operationalizing refers to the process of actually provisioning computing resources (physical and/or virtualized) to generate the system that will be deployed to handle the analytics project in accordance with the final analytic plan, e.g., system 320 in FIG. 3. This may involve provisioning VMs and LUNs as well as other virtual and physical assets that are part of cloud infrastructure 110 in FIG. 1. The provisioned system will then analyze subsequent data that is obtained for the given complex data problem.

Given the detailed description of the data analytics lifecycle phases above, we now make some observations and introduce some other features and advantages of the system.

Assume that the data scientist 301 is at a later phase in the process but then realizes that he/she forgot to include some data in the discovery phase 404 that is needed to complete the analysis. Advantageously, the interrelated and iterative nature of DAL 402 and the flexibility of the system used to automate the DAL (system 300) provide the data scientist with the ability to return to the discovery phase, correct the error, and return to a subsequent stage with the results for each stage affected by the change being automatically updated.

During the model building phase 410, it is not known what resources are going to be needed, which have a specific cost, and definition of what would be included (amount of storage, number of VMs, the analytics tools needed, etc.). Being able to know the approximate cost and configuration needed would be very useful for the process of tuning the model based on cost or configuration constraints. Thus, during each phase of the DAL 402, the data scientist 301 is presented (at GUI 301) with an inventory of the current infrastructure, services, and tools needed and their approximate cost as changes are made to the parameters associated with the analysis. This will be further described below in the context of FIG. 5. This allows the data scientist to remove or change the model dynamically based on resource constraints (e.g., cost or VM limits).

Once the analytics work package 316 is defined, provisioning the resources needed to most efficiently support the analysis is important. As such, embodiments of the invention automate and execute work packages for the data scientist by constructing the work package and providing resource and cost estimates throughout the DAL.

Many times, introducing new raw, source data sets into a project can have cascading effects on the size of the analytic sandbox (see data preparation phase 406 above) needed to support the analysis. Embodiments of the invention provide selectable sizing multiples to dynamically provision the system parameters, such as a storage capacity, bandwidth required, and compute power depending on the type of new data involved and its size. For example, these sizing multiples could be used between phases 404 and 406, between 406 and 408, and even between phase 408 and 410. The sizing multiples serve as a mechanism for dynamically provisioning and adjusting the size, capacity, and constraints needed for the analytic sandbox.

By way of example only, assume there is 100 GB worth of innovation data that is to be analyzed. The data preparation module 306 multiplies this value by some constant (e.g., 10 or 20 times) in order to estimate the capacity of the analytic sandbox. That is, the data scientist will take the 100 GB of data and run transformations and other experiments that will require additional amounts of capacity. Therefore, the data preparation module 306 creates a work package specification that states: "allocate 1 TB of sandbox data which has the following features . . . . " This aspect of the work package instructs cloud provisioning software to allocate appropriately.

It is also realized that privacy of data is a major concern when mining large amounts or correlating various types of data. Privacy of the individuals needs to be protected while still allowing useful analysis and presentation of the data. Embodiments of the invention provide for masking capabilities in the work package 316, as well as any data presented by the system, for the data scientist, as well as creating contextual views based on the identity of the consumer of the output. This feature is very useful, particularly in a highly regulated data environment.

Further, the privacy/masking techniques associated with the work package 316 and other data can be employed to protect the data from wholesale viewing by the data scientist or an output generated by the work package execution. Also it is possible to create multiple views of the data based on privacy constraints tied to the context and role of the potential viewer. For example, a mid-level sales manager may have the ability to see consolidated data across the sales areas in the country, but his/her subordinates within the same area would only be allowed to see that specific area's data view as they are not authorized to see data across the country for regulatory (e.g., Security and Exchange Commission) reasons.

As a consequence of the privacy aspect, the data scientist can receive a diagnostic summary stating the resources they have access to for the analytical work they are planning to pursue.

While some illustrative privacy/masking techniques have been described above, it is to be understood that alternative privacy protection controls (such as, but not limited to, privacy anonymization) can be employed in system 300.

In addition, the operationalizing module 314 can make predictions of the types of additional technology resources and tools needed to complete the analytics and move into a production environment, based on the type of analytics being undertaken. As a result, the data scientist would be notified early if they needed to request additional tools that would enable them to complete their work. This aspect of system 300 enables the data scientist to initiate funding requests earlier in the DAL, identify people if specific skill sets are needed (such as a Hadoop™ expert in addition to a mathematician), and operationalize the resources before the data modeling stages (e.g., identify this during phase 404 of the DAL, rather than in phase 410) to avoid bottlenecks in the project.

It is further realized that a work package containing a larger sized dataset will contribute to an increased cost, as provisioning will increase. Besides size, other dataset characteristics may impact cost, e.g., perhaps publicly available data is cheaper than sensitive data, which requires an anonymization service. System 300 gives the data scientist insight into which dataset characteristics would be most beneficial to the analytic plan. The system 300 can also perform what-if analysis on different identified dataset and analytic plan scenarios. This can be done in conjunction with the dataset discovery system of FIG. 5.

Further, it is realized that the work of all data science projects are not equal. For example, a critical project such as one directed by an officer of the company (e.g., CEO) could require higher priority and take precedence over existing work packages. Also, perhaps the CEO's work package should be executed faster than regular data scientists, thus increasing provisioning. System 300 accounts for the priority levels associated with the data scientists.

Advantageously, system 300 allows a data scientist to know ahead of execution time the execution costs. Additionally, the system is able to dynamically change system parameters as the data scientist begins to refine the data and the analysis without having to start all over again or manually de-provision or increase the provisioned resources. System 300 creates a dynamic work package that includes the parameters needed to move through the analytics lifecycle and include the automation necessary to allow the data scientist to focus on fine tuning the parameters and not on manually changing the infrastructure or data ingest process.

II. Dataset Discovery System

We now turn to a description of dataset discovery according to one or more illustrative embodiments of the invention. As mentioned above, dataset discovery may be implemented in the discovery module 304 and/or the data preparation module 306 or any other module in system 300 (and combinations thereof) described above in Section I. Also, dataset discovery may alternatively be implemented as a module separate from the modules of system 300 shown in FIG. 3, e.g., as a dataset discovery module that is operatively coupled to system 300, receiving an initial, intermediate or final work package 316, and providing dataset discovery techniques for further use by system 300. One illustrative example of such a dataset discovery system or module will be described below in the context of FIG. 5.

Alternatively, dataset discovery techniques as will be described herein can be implemented independent of and separate from system 300, and thus are not intended to be limited to any data analytics lifecycle automation and provisioning system described herein. That is, the techniques may be implemented in a standalone dataset discovery system or in some other computing system that can benefit from advantages of dataset discovery.

As explained above in the context of FIGS. 1-4, a data science experiment runs through a lifecycle which includes the creation of hypotheses, the collection of data into a sandbox, the exploration of the data, and the running of analytic models across that data. However, a problem that a business user or data scientist faces is after writing initial hypotheses in the first phase of the data analytics lifecycle, it is challenging to understand what datasets are needed and if the data exists within an organization, or outside of it, that can be used to test a hypothesis.

For example, during the discovery phase of the data analytics lifecycle, the business user may develop one or more hypotheses that can be explored and tested with data. The next challenge to arise is to determine if data exists that would enable a user to test these ideas and the state of this data, in terms of its quality and availability. Also, after completing the discovery phase of the data analytics lifecycle, business users and data scientists may have a clear idea of the hypotheses they would like to test. However, they may have a limited understanding of the data dependencies they have within an organization.

Further, even if an appropriate dataset can be identified to test a particular idea, it can be very difficult to understand the provenance of a dataset, or the relationship of a specific dataset to other, related datasets within an organization. Also, many times datasets are used for a specific project, but although the people performing the analytics project have a strong background in algorithms, they may not have expertise in data privacy. As such, personal or sensitive information about people may be shared in contexts where it should not be.

Accordingly, embodiments of the invention provide methods techniques that assist users in discovering datasets within and/or outside an enterprise for testing hypotheses whereby such data is accessible and is managed to protect privacy for a given business problem. As mentioned above, these automated techniques for discovering relevant datasets for a given hypothesis are part of the first and second phases of the data analytics lifecycle, which is used for data science projects and includes vetting and translation of a business problem into an analytical challenge that can be tested through quantitative methods. Further, embodiments of the invention enable business analysts and data scientists to leverage a set of methods that catalogue and describe an enterprise's datasets to support hypothesis tests within a work package that is created to automate the data analytics lifecycle.

Figure 5:
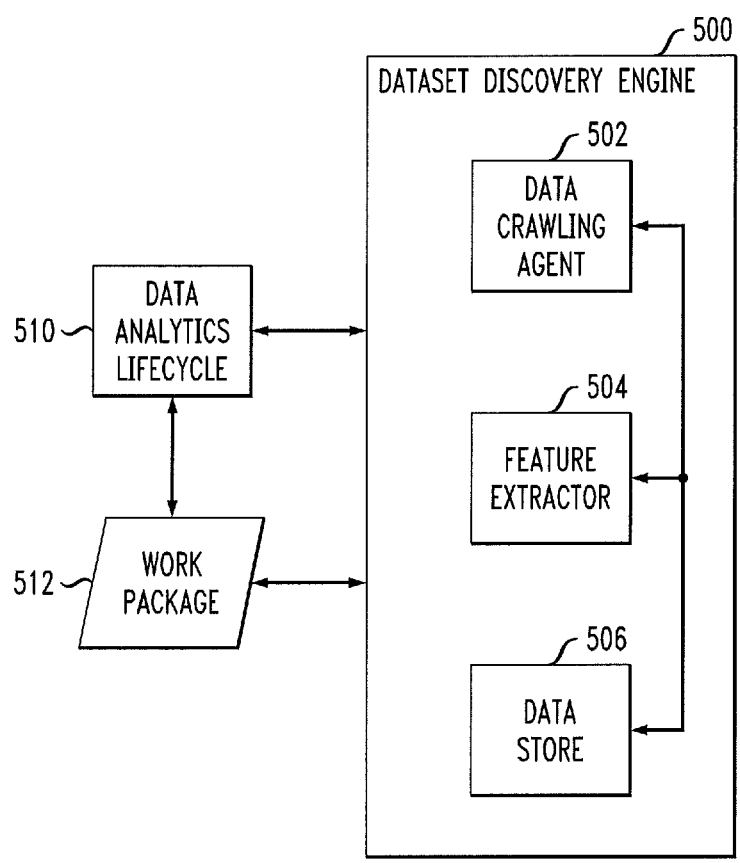
FIG. 5 illustrates a dataset discovery engine and methodology, in accordance with one embodiment of the invention.

FIG. 5 illustrates a dataset discovery engine and methodology, in accordance with one embodiment of the invention. As shown, dataset discovery engine 500 is operatively coupled to a data analytics lifecycle 510 and a work package 512. It is to be appreciated that the data analytics lifecycle 510 and the work package 512 represent, in one embodiment, data analytics lifecycle automation and provisioning system 300 whereby data analytics lifecycle 510 is automated to generate work package 512. Dataset discovery engine 500 includes a data crawling agent 502, a feature extractor 504, and a data store 506.

Data crawling agent 502, within the context of the work package 512, crawls local and wide area public and private information networks to identify, collect and catalog datasets. These datasets can be comprised of, by way of example only, text, email, images, video, voice mail, and more traditional RDBMS (relational database management system) structures. The data crawling agent 502 write log files cataloguing the data it finds, and also describe these data sources using metadata, such as type of data, size, and topic areas. Such data catalog files (data catalogs) are stored in data store 506.

Thus, for example, the data crawling agent 502 locates, in an enterprise (or outside the enterprise), relevant datasets that satisfy the hypothesis from the work package 512. These datasets can be dynamically located or located from pre-stored datasets. The data crawling agent 502 also filters the located datasets based on what the agent learns from examining and/or analyzing the work package 512. In one example, the agent filters hypothesis-relevant data from non-hypothesis-relevant data. This can be done by identifying associations between datasets in the data catalogs. Also, provenance data can be generated and used for datasets in the data catalogs.

Feature extractor 504 extracts features from the datasets identified by the data crawling agent 502. By interpreting data attributes written to the log files that describe the enterprise's data elements, it is possible to infer features of these datasets. These features could relate to the presence of conditions or properties related to the data, such as, but not limited to, its rate of change, the presence of information that contains personally identifiable information (PI), and the type of data, both in terms of the structure (such as, for example, unstructured, quasi-structured, semi-structured, and structured) and its potential use cases (for example, revenue information that can be used for a financial analysis byproduct).

When the feature extractor 504 determines the presence of private data (PII) in the identified datasets, the engine 500 can prevent use of the private data from the identified datasets. One prevention example is by masking the private data in the identified datasets.

Data store 506 stores the data catalogs generated by the data crawling agent 502 and feature extractor 504. Understanding the datasets and cataloguing them in the manners mentioned above enables an algorithm to run and use these datasets as elements within a superset. In other words, if a user wants to use Dataset A, an algorithm can identify associations of other datasets based on their metadata that are similar (e.g., people who use Dataset A, also use Dataset B). Similarly, Social Network Analysis can be run on the datasets that behave as data elements. Instead of using Social Network Analysis to identify influential people who are nodes within a social network, the data discovery techniques according to one or more embodiments can be used to identify influential datasets in various kinds of decision making, where the datasets themselves act as nodes and their properties (such as, for example, rate of change, influence on other related data sets, or provenance) are edges in a social graph. This shows which datasets influence the creation and growth of other datasets, and can also show which kinds of datasets are used to support which kinds of business decisions. In addition, the data store 506 can show the provenance of certain kinds of datasets and their elements, catalog the quality of specific datasets, and identify a level of trustworthiness of a given dataset.

It is to be appreciated that the data stored in data store 506 can then be provided back to the data analytics lifecycle 510 to complete one or more other phases. For example, the hypothesis can be tested using at least a portion of the discovered datasets. The hypothesis can then be refined. The work package 512 can also be updated based on the refined hypothesis to generate a refined work package for use by the one or more phases of the automated data analytics lifecycle.

It is to be further appreciated that converging technology advances in storage (such as, e.g., scale-out Network Attached Storage or NAS), compute resources (e.g., high performance computing) and applications (such as, e.g., Hadoop™ and massively parallel processing or MPP) can be employed to develop data catalogs, as described above, that assist users in using data that is relevant to their specific hypothesis and set of quantitative tests.

The following are some illustrative non-limiting examples using dataset discovery techniques according to one or more embodiments of the invention. By way of example only, the data discovery engine 500 of FIG. 5 may be configured to operate consistent with these and other examples.

Example 1

Data Cataloguing

Assume a business user is trying to write a hypothesis to test and find out who are his or her company's most value customers. After writing the hypotheses and writing it to the data analytics lifecycle work package, the data crawling agent scans all of the data-related assets on the company's network and writes log files cataloguing the various data elements and datasets. At this stage, instead of the user looking for datasets or asking their IT (information technology) group to suggest datasets, the data analytics lifecycle work package can identify which datasets are available and relevant to support testing the hypothesis that the business user created. This saves time for the business user, and also enables him or her to develop a more holistic solution. An IT person may be familiar with the most commonly used dataset or repository, but not other less often used, but relevant, datasets. The crawler's log file may contain many potential datasets that can be useful for the analysis and give the user a more comprehensive set of data options to work with.

Example 2

Understanding Dataset Constraints

Assume a business user now has ideas of which corporate datasets to use for an analysis, but does not know which datasets are changing rapidly or contain sensitive information. A business or scientific user can be notified that certain data they want to use is changing rapidly or stale, and is not actively managed or not at a sufficient level of quality. In addition, the user can understand if he has written a hypothesis that requires data that infringes on the PII standards (Personal Identifiable Information such as name, address, Social Security number, credit card number, etc.). The data crawler's log file can enumerate to the data scientist or business user which datasets or data fields contain sensitive data or pose greater risk of a privacy exposure and breach. In addition, alternative datasets can be used by a data scientist that sufficiently obscures PII-related data to protect against PII violations.

Example 3

Mining Datasets within a Work Package

Assume a business user is performing an analysis of customer lifetime value (CLTV). After using the enterprise's traditional sales and marketing data, the user would like to know about similar datasets that may be of interest to supplement and expand his or her data analysis. Treating whole datasets as data elements that are members of a larger superset makes it possible to develop a dataset recommender system to assist business users in finding corporate datasets that share similar attributes to a given dataset and are the most useful in a given context or situation.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method comprising:
obtaining an initial work package defining at least one hypothesis associated with a given data problem, the initial work package being generated in accordance with one or more phases of an automated data analytics lifecycle;

identifying a plurality of datasets;

discovering one or more datasets in the plurality of datasets that are relevant to the at least one hypothesis, wherein discovery comprises performing data mining on the plurality of datasets; and testing the at least one hypothesis using at least a portion of the one or more discovered datasets;

wherein the obtaining, identifying, discovering, and testing steps are performed on one or more processing elements associated with a computing system.

2. The method of claim 1, wherein the step of data mining of the plurality of datasets further comprises identifying one or more datasets in the plurality of datasets based on the initial work package.

3. The method of claim 2, wherein the step of discovering one or more datasets in the plurality of datasets that are relevant to the at least one hypothesis further comprises generating one or more data catalogs from the one or more identified datasets.

4. The method of claim 3, wherein the step of discovering one or more datasets in the plurality of datasets that are relevant to the at least one hypothesis further comprises identifying associations between at least a portion of the one or more datasets in the one or more data catalogs.

5. The method of claim 4, wherein the step of discovering one or more datasets in the plurality of datasets that are relevant to the at least one hypothesis further comprises generating provenance data for at least a portion of the one or more datasets in the one or more data catalogs.

6. The method of claim 2, wherein the step of discovering one or more datasets in the plurality of datasets that are relevant to the at least one hypothesis further comprises extracting one or more features from the one or more identified datasets.

7. The method of claim 6, wherein extracting one or more features from the one or more datasets further comprises determining the presence of private data in the one or more identified datasets.

8. The method of claim 7, further comprising preventing use of the private data from the one or more identified datasets.

9. The method of claim 7, further comprising masking the private data in the one or more identified datasets.

10. The method of claim 6, wherein extracting one or more features from the one or more datasets further comprises determining one or more properties associated with the one or more identified datasets.

11. The method of claim 10, wherein the one or more properties comprise at least one of a data change rate, a data structure type, and data use type.

12. The method of claim 1, further comprising refining the at least one hypothesis as a result of the testing step.

13. The method of claim 12, further comprising updating the initial work package based on the refined hypothesis to generate a refined work package for use by the one or more phases of the automated data analytics lifecycle.

14. A computer program product comprising a processor-readable storage medium having encoded therein executable code of one or more software programs, wherein the one or more software programs when executed by one or more processing elements of the computing system implement the steps of:

obtaining an initial work package defining at least one hypothesis associated with a given data problem, the initial work package being generated in accordance with one or more phases of an automated data analytics lifecycle;

identifying a plurality of datasets;

discovering one or more datasets in the plurality of datasets that are relevant to the at least one hypothesis, wherein discovery comprises performing data mining on the plurality of datasets; and testing the at least one hypothesis using at least a portion of the one or more discovered datasets.

15. An apparatus comprising:

a memory; and at least one processor operatively coupled to the memory and configured to: obtain an initial work package defining at least one hypothesis associated with a given data problem, the initial work package being generated in accordance with one or more phases of an automated data analytics lifecycle; identify a plurality of datasets; discover one or more datasets in the plurality of datasets that are relevant to the at least one hypothesis, wherein discovery comprises performing data mining on the plurality of datasets; and test the at least one hypothesis using at least a portion of the one or more discovered datasets.

16. The apparatus of claim 15, wherein data mining of the plurality of datasets further comprises identifying one or more datasets in the plurality of datasets based on the initial work package.

17. The apparatus of claim 16, wherein discovering one or more datasets in the plurality of datasets that are relevant to the at least one hypothesis further comprises generating one or more data catalogs from the one or more identified datasets.

18. The apparatus of claim 16, wherein the step of discovering one or more datasets in the plurality of datasets that are relevant to the at least one hypothesis further comprises extracting one or more features from the one or more identified datasets.

19. The apparatus of claim 15, wherein the at least one processor is further configured to refine the at least one hypothesis as a result of the testing step.

20. The apparatus of claim 19, wherein the at least one processor is further configured to update the initial work package based on the refined hypothesis to generate a refined work package for use by the one or more phases of the automated data analytics lifecycle.

\* \* \* \* \*